US009975061B2

United States Patent
Keckler, III et al.

(10) Patent No.: US 9,975,061 B2
(45) Date of Patent: May 22, 2018

(54) EVAPORATIVE CONCENTRATOR AND ASSOCIATED METHODS

(75) Inventors: Russell M. Keckler, III, Findlay, OH (US); Daniel K. DeArment, Findlay, OH (US)

(73) Assignee: Aptim Intellectual Property Holdings, LLC, Baton Rouge, LA (US)

( * ) Notice: Subject to any disclaimer, the term of this patent is extended or adjusted under 35 U.S.C. 154(b) by 1552 days.

(21) Appl. No.: 13/344,196

(22) Filed: Jan. 5, 2012

(65) Prior Publication Data

US 2012/0168092 A1 Jul. 5, 2012

Related U.S. Application Data

(60) Provisional application No. 61/429,843, filed on Jan. 5, 2011.

(51) Int. Cl.

| | |
|---|---|
| *B01D 1/16* | (2006.01) |
| *B01D 45/12* | (2006.01) |
| *B01D 45/16* | (2006.01) |
| *B01D 3/42* | (2006.01) |

(52) U.S. Cl.
CPC ........... *B01D 3/4216* (2013.01); *B01D 45/12* (2013.01); *B01D 45/16* (2013.01); *B01D 1/16* (2013.01)

(58) Field of Classification Search
CPC ........ B01D 45/12; B01D 45/14; B01D 45/16; B01D 1/16; B01D 1/18
USPC .......................................................... 95/216
See application file for complete search history.

(56) References Cited

U.S. PATENT DOCUMENTS

| | | | | |
|---|---|---|---|---|
| 3,041,986 | A | * | 7/1962 | Reilly ........................... 110/215 |
| 4,279,627 | A | * | 7/1981 | Paul ...................... B01D 50/004 |
| | | | | 261/79.2 |
| 4,457,289 | A | * | 7/1984 | Korenberg ................. B01J 8/32 |
| | | | | 110/245 |
| 4,838,184 | A | | 6/1989 | Young et al. |

(Continued)

FOREIGN PATENT DOCUMENTS

| | | |
|---|---|---|
| FR | 2875721 | 3/2006 |
| WO | WO0391163 | 6/2003 |
| WO | WO 2008112793 A1 * | 9/2008 |

OTHER PUBLICATIONS

Duesel. Bernard F et al "Breakthrough Technology for On-Site Leachate Treatment".
Mikropul Wet Scrubbers

*Primary Examiner* — Jonathan Miller
*Assistant Examiner* — Jonathan Luke Pilcher
(74) *Attorney, Agent, or Firm* — Osha Liang LLP

(57) ABSTRACT

Disclosed herein are methods of concentrating liquid waste streams including methods comprising drawing a fluidized gas liquid mixture containing water from a mixing cavity into a multi-stage cyclonic separator comprising a first cyclonic separation chamber and a second cyclonic separation chamber in fluid communication with the first cyclonic separation chamber; draining a liquid discharge from the cyclonic separator into a liquid sump; and supplying a liquid contained in the sump to the mixing cavity. Related methods comprise steps such as supplying a liquid waste feed to a concentrator having a mixing cavity and a first cyclonic separation chamber and feeding a supply gas to the mixing cavity. Evaporative concentrators configured to practice these methods are also disclosed.

18 Claims, 3 Drawing Sheets

(56) References Cited

U.S. PATENT DOCUMENTS

| | | | |
|---|---|---|---|
| 4,957,512 A * | 9/1990 | Denisov | B01D 53/18 |
| | | | 95/66 |
| 5,221,301 A * | 6/1993 | Giuricich | 55/345 |
| 5,279,646 A * | 1/1994 | Schwab | 95/201 |
| 5,342,482 A | 8/1994 | Duesel, Jr. | |
| 5,484,279 A | 1/1996 | Vonasek | |
| 5,601,040 A | 2/1997 | McGill | |
| 5,934,207 A | 3/1999 | Echols et al. | |
| 5,922,290 A * | 7/1999 | Jenne | B01D 53/72 |
| | | | 110/211 |
| 6,276,672 B1 | 8/2001 | Schmitt | |
| 6,375,803 B1 | 4/2002 | Razzaghi et al. | |
| 6,656,250 B1 * | 12/2003 | Listner et al. | 95/216 |
| 7,160,358 B2 * | 1/2007 | Spink | B01D 46/003 |
| | | | 34/467 |
| 8,721,771 B2 * | 5/2014 | Duesel et al. | 95/272 |
| 8,741,100 B2 * | 6/2014 | Duesel, Jr. | 159/4.01 |
| 8,741,101 B2 * | 6/2014 | Duesel, Jr. | 159/4.01 |
| 2005/0229780 A1 * | 10/2005 | Spink | B01D 46/003 |
| | | | 95/65 |
| 2006/0240368 A1 | 10/2006 | Duesel, Jr. et al. | |
| 2006/0240369 A1 | 10/2006 | Duesel, Jr. et al. | |
| 2008/0110417 A1 | 5/2008 | Smith | |
| 2008/0118310 A1 | 5/2008 | Graham | |
| 2008/0307964 A1 * | 12/2008 | Spink | B01D 46/003 |
| | | | 95/60 |
| 2009/0053659 A1 | 2/2009 | Duesel, Jr. et al. | |
| 2010/0176042 A1 | 7/2010 | Duesel, Jr. et al. | |
| 2010/0236724 A1 | 9/2010 | Duesel, Jr. et al. | |

* cited by examiner

EVAPORATIVE CONCENTRATOR AND ASSOCIATED METHODS

This application claims the benefit of provisional application No. 61/429,843 filed on Jan. 5, 2011 and entitled Evaporative Concentrator and Associated Methods.

Embodiments disclosed herein may be used for the purpose of concentrating leachate from landfills, thereby decreasing the total volume of the leachate, resulting in a lower leachate disposal cost. In one embodiment, landfill gas containing substantial quantities of methane is combusted to produce energy and the waste heat of the exhaust gas from that combustion is used as a feed to the concentrator. In an embodiment of the invention, landfill leachate is concentrated by the system using waste heat from the combustion of landfill gases with the concentrated leachate either being returned to the landfill or disposed of off-site.

A method of concentrating a liquid waste stream described herein may, for example, comprise supplying a liquid waste feed to a concentrator having a mixing cavity and a first cyclonic separation chamber; feeding a supply gas to the mixing cavity; supplying a mixing cavity liquid feed into the mixing cavity; passing a fluidized gas liquid mixture from the mixing cavity to the first cyclonic separation chamber; releasing a concentrated liquid discharge from the concentrator; wherein the liquid waste feed is aqueous; wherein the liquid waste feed is not potable; wherein the liquid waste feed is the only substantial source of liquid phase water added to the concentrator; wherein the concentrated liquid discharge has a volumetric flow rate that is less than 50% of the volumetric flow rate of the liquid waste feed; wherein a volume reduction rate is represented by the difference between the liquid waste feed flow rate and the concentrated liquid discharge flow rate and the volume reduction rate is greater than 2% of the mixing cavity liquid feed flow rate. In a related example, the concentrated liquid discharge flow rate and the volume reduction rate is greater than 3% of the mixing cavity liquid feed flow rate. In a related example, the liquid waste feed contains solids. In a related embodiment, the concentrated liquid discharge has a volumetric flow rate that is less than 20% of the volumetric flow rate of the liquid waste feed. In a related embodiment, the concentrated liquid discharge has a volumetric flow rate that is less than 5% of the volumetric flow rate of the liquid waste feed.

A method of concentrating a liquid waste stream described herein may, for example, comprise drawing a fluidized gas liquid mixture containing water from a mixing cavity into a multi-stage cyclonic separator comprising a first cyclonic separation chamber and a second cyclonic separation chamber in fluid communication with the first cyclonic separation chamber; draining a liquid discharge from the cyclonic separator into a liquid sump; and supplying a liquid contained in the sump to the mixing cavity.

A method of concentrating a liquid waste stream described herein may, for example, comprise supplying a first exhaust feed gas to a supply conduit through a first exhaust flow control device; regulating the first exhaust flow control device based on the pressure of the first exhaust feed gas; providing a supply gas from the supply conduit to a mixing cavity; introducing a mixing cavity liquid feed into the mixing cavity; conveying a fluidized gas liquid mixture from the mixing cavity to a first cyclonic separation chamber; removing a first liquid portion from the fluidized gas liquid mixture within the first cyclonic separation chamber; removing a second liquid portion from the fluidized gas liquid mixture in a second cyclonic separation chamber; and draining a liquid discharge from the first cyclonic separator into a liquid sump. In a related example, the first exhaust is a byproduct of the combustion of a biofuel. In a related example, the gaseous discharge from the second cyclonic separation chamber flows into a gaseous concentrator discharge line. In a related example, the gaseous discharge from the second cyclonic separation chamber has a relative humidity that is greater than a gaseous discharge from the gaseous concentrator discharge line. In another related example, the first exhaust feed gas is greater than 600° F. In another related example, a biofuel combustion exhaust stream is supplied to the gaseous concentrator discharge line.

An evaporative concentrator described herein may, for example comprise a supply conduit in fluid communication with a source of a combustion heated gas; a mixing cavity in fluid communication with the supply conduit; a venturi in fluid communication with the mixing cavity; a multi-stage cyclonic separator in fluid communication with the venturi; wherein the cyclonic separator comprises a first cyclonic separation chamber and a second cyclonic separation chamber; a sump; a recycle line arranged and configured to deliver liquid from the sump to the mixing cavity; a gaseous concentrator discharge line; a gaseous flow path connecting the supply conduit, the mixing cavity, the venturi, the first cyclonic separation chamber, the second cyclonic separation chamber, and the gaseous concentrator discharge line respectively; and wherein both the first cyclonic separation chamber and the second cyclonic separation chamber drain to the sump.

DETAILED DESCRIPTION

Exhaust from one or more engines may pass through muffler 1 then through a control system designed to regulate the pressure of the gas exiting the combustion system. In an embodiment of the invention, the source of the combustible gas is gas produced by a landfill. In related embodiments, the fuel may be natural gas, diesel, or another combustible material. In alternate embodiments, the engines could be any other conventional form of extracting energy from a combustible gas. Such alternatives include but are not limited to devices such as piston engines, boilers, furnaces, turbines, heat exchangers and other similar equipment. In such embodiments, a substantial fraction of the useful energy of the gas being consumed is converted to a primary use with a significant portion of the power of energy available being utilized in the evaporative concentrator system. In a further related embodiment, the heat source is a burner or a flare. In distinct embodiments, the various individual sources of exhaust, namely exhaust selected from exhaust in first engine exhaust line 10, second engine exhaust line 11, and third engine exhaust line 12, may have one or more of the following characteristics: gauge pressure above −30 inches of water column; gauge pressure above −10 inches of water column; gauge pressure above −4 inches of water column;

gauge pressure below 0 inches of water column; gauge pressure below 10 inches of water column; gauge pressure below 30 inches of water column; temperature above 600° F.; temperature above 750° F.; temperature above 800° F.; temperature below 900° F.; temperature below 950° F.; and temperature below 1800° F.

Figure 1:
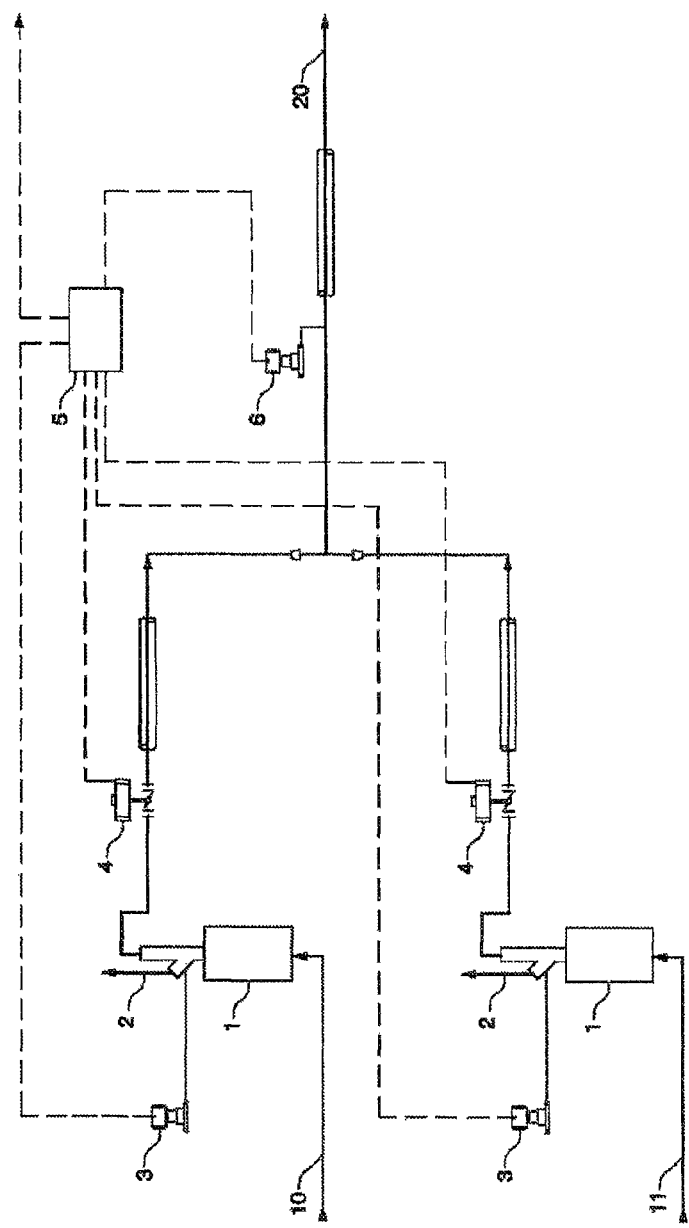
FIG. 1 represents piping and controls between two separate engines and a waste heat manifold that feeds the evaporative concentrator.
Figure 2:
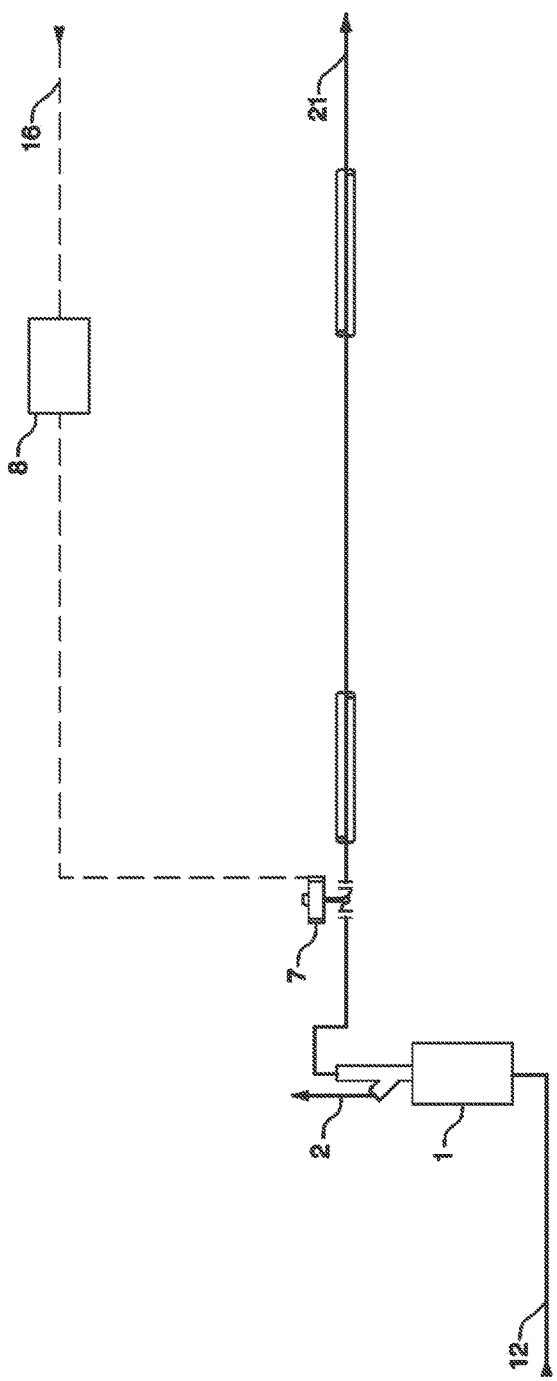
FIG. 2 represents piping and controls between a third engine and a supplemental waste heat manifold that provides waste heat to the evaporative concentrator exhaust stack.
Figure 3:
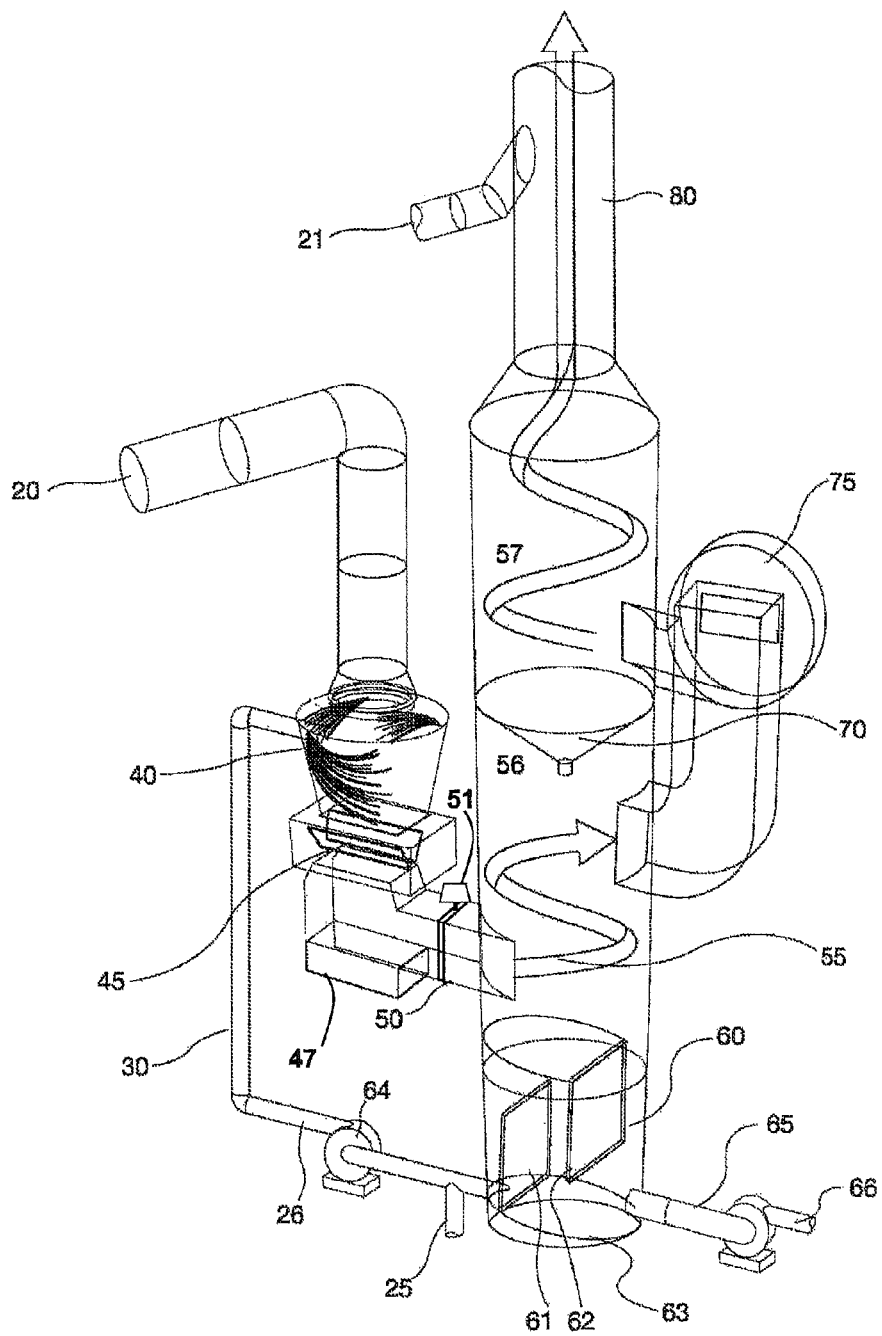
FIG. 3 represents a perspective view of the evaporative concentrator.

The embodiment depicted in FIG. 1 represents two independent heat sources which are joined together prior to introducing a hot gas into the evaporative concentrator system. In FIG. 1, first engine exhaust line 10 provides exhaust gas to muffler 1 which passes either to exhaust stack 2 or control valve 4. Exhaust passing through control valve 4 ultimately enters waste heat manifold 20. Exhaust from a second engine similarly passes through second engine exhaust line 11, then through control valve 4 ultimately entering waste heat manifold 20. In FIG. 2, exhaust gases from a third engine pass through third engine exhaust line 12, through muffler 1, passed exhaust stack 2 through which some of the gases are discharged, then through control valve 7, and ultimately enter supplemental waste heat manifold 21 which supplies exhaust to exhaust stack 80. Alternate embodiments of the invention include varying numbers of sources of hot gas and varying numbers of evaporative concentrator systems. Configurations of these alternate embodiments will be apparent to a person having ordinary skill in the art based on the disclosures herein.

Waste heat manifold 20 supplies energy in the form of exhaust gas to the liquid concentrating portion of the evaporative concentrator which concentrates liquid from leachate supply line 25 substantially reducing the liquid volume before it is discharged by way of sump blowdown pump 66. Gas leaving the liquid concentrating portion of the evaporative concentrator, including water vapor extracted from the liquid delivered by leachate supply line 25, exits the concentrator system through exhaust stack 80. The gases exiting exhaust stack 80 may optionally be supplemented and modified by the addition of exhaust gas from supplemental waste heat manifold 21. Details of the construction and operation of the liquid concentrating portion of the evaporative concentrator are as follows:

Separation vessel 55 is made up of several components including sludge settling tank sump 60, first cyclonic separation zone 56, second cyclonic separation zone 57, and exhaust stack 80. Leachate entering first cyclonic separation zone 56 contains leachate entrained in the exhaust gas and that leachate may contain either sludge or solids. As previously described, first cyclonic separation 56 delivers most of the liquid including the entrained solids into sludge settling tank sump 60. Material is removed from sludge settling tank sump 60 by leachate recirculation pump 64 and sump blowdown pump 66. The material in sludge settling tank sump 60 moves at a velocity that is conducive to the solids contained in the leachate settling to sump floor 63. First baffle 62 and second baffle 61 are set up to decrease the total amount of solids delivered to leachate recirculation pump 64. First baffle 62 both prevents floating materials from directly approaching the suction line of leachate recirculation pump 64 and aids in directing heavy solid particles toward sump floor 63 and sump discharge line 65. Second baffle 61 prevents sump material near sump floor 63, which typically has the highest concentration of solids, from being immediately discharged into leachate recirculation pump 64. Discharge line 65 is connected near the low point of sludge settling tank sump 60 such that sump blowdown pump 66 will draw a liquid fraction from sludge settling tank sump 60 having a relatively high fraction of solids.

The upper portions of separation vessel 55 are configured to separate the vast majority of liquids and solids delivered from conduit 50 from the exhaust gas. Cyclonic separation occurs in first cyclonic separation zone 56 as described above with the exhaust from first cyclonic separation zone 56 being drawn into a variable speed discharge fan 75 which blows that exhaust tangentially into second cyclonic separation zone 57. The separation action of second cyclonic separation zone 57 is comparable to that of first cyclonic separation zone 56 and second cyclonic separation zone 57 is separated from first cyclonic separation zone 56 by an intermediate baffle 70. Intermediate baffle 70 may be conical as shown in the present example or it may be any other configuration which both limits the amount of exhaust that is recycled through variable speed discharge fan 75 and allows separated leachate to pass from second cyclonic separation zone 57 to first cyclonic separation zone 56. Exhaust from second cyclonic separation zone 57 ultimately passes through exhaust stack 80 to the atmosphere. Exhaust stack 80 is shown connected to supplemental waste heat manifold 21. This configuration is optional and allows for the introduction of hot exhaust gas is into exhaust stack 80. Doing so minimizes the possibility that a visible vapor plume would discharge through exhaust stack 80.

Although the present example is directed to the concentration of landfill leachate, it should be understood that the present process is broadly applicable to other systems in which there is a need to concentrate a liquid and a relatively hot gas stream is available. Liquid flow may be distributed within leachate recirculation system 30 so as to have a wetted throat. In one embodiment, flow from liquid feed nozzles 40 spray downward into a wetted wall adjustable throat Venturi 45. Flow velocity increases as the material approaches the throat, and decreases after it passes through the throat. In certain embodiments, wetted wall adjustable throat venturi 45 utilizes shearing and impaction forces to atomize the liquid, enhancing heat transfer and thus vaporization. The wetted wall adjustable throat venturi 45 may be controlled in a manner that maintains a constant differential pressure across the venturi. In related embodiments, wetted wall adjustable throat venturi 45 may be controlled by any number of other suitable combinations of control devices including various combinations of dampers, valves, actuators and the like. In one embodiment, the throat area is decreased by shaft rotation so that the blade edges move from the sidewall toward the center line of the throat.

Expansion of the mixed vapor/liquid stream occurs downstream from the throat. Reducing the velocity causes an agglomeration of the droplets which in turn results in larger droplets that separate from the vapor flow due to gravity. In an embodiment of the invention, immediately following the expansion at the outlet of wetted wall adjustable throat venturi 45, the flow direction is changed. In this embodiment, the change in direction represents approximately a right angle. The reduction of velocity, coupled with a change in flow direction from vertical to horizontal, results in a partial disengagement of the vapor and liquid droplets/solid material. A portion of the disengaged liquid falls into wetted elbow 47 which collects solids and decreases the erosion of conduit 50. Clean out ports may be provided directly beneath the expansion area so as to facilitate removal of solid/sludge material that disengages as a result to the change in flow direction. In the present embodiment, butterfly valve 51 is located in conduit 50 and controls the differential pressure between the upstream and downstream sides of butterfly valve 51 within conduit 50. Butterfly valve 51 may either be controlled manually or automatically.

Operation of butterfly valve 51 impacts the velocity of the vapor entering separation vessel 55 in turn impacting the centrifugal force on the entrained liquid influencing the liquid vapor separation efficiency in first cyclonic separation zone 56. After passing through conduit 50, liquid, entrained droplets and vapor enter first cyclonic separation zone 56 tangentially. The result of the tangential entry is that further separation occurs by centrifugal force. The liquid droplets impact the sides of the vessel and consequently plunge into sludge settling tank sump 60.

Separation vessel 55 is in effect both a liquid/vapor separator above sludge settling tank sump 60 and a liquid/solid separator within sludge settling tank sump 60. The liquid being evaporated may contain various degrees of solids. It is further contemplated that those solids become concentrated within sludge settling tank 60 by virtue of concentration through evaporation, by settling, and potentially by precipitation.

The baffled gravity separator configuration of sludge settling tank sump 60 is capable of removing fine solids on a continuous or batch basis without plugging. In this embodiment, second baffle 61 prevents solids that have settled and solids that are near sump floor 63 from directly entering sump liquid discharge line 65 and first baffle 62 prevents solids from moving across the sump liquid surface. A substantially liquid fraction from sludge settling tank sump 60 is carried to leachate recirculation pump 64 and then returned to liquid feed nozzles 40 via leachate recirculation line 26. A level transmitter may be used to monitor the level of sludge settling tank sump 60. A flowmeter may be used to monitor the flow in leachate recirculation line 26. Total liquid feed into the system is controlled such that a reasonable sump level is maintained. Liquid may be added to the system by way of leachate supply line 25, by direct addition to sludge settling tank sump 60, or by injection through liquid feed nozzles 40.

The solids in the liquid in sludge settling tank sump 60 will be higher than that of the fresh liquid stream coming from leachate supply line 25. The baffle system concentrates the solids/particulate material from leachate including any precipitated solids so as to minimize scaling of the equipments surfaces. Sump blowdown pump 66 removes a solid laden aqueous stream from sludge settling tank sump 60 by way of sump discharge line 65 such that solids within the sump are maintained at a concentration that is low enough to avoid the plugging of equipment and at a concentration that is substantially greater than the concentration of solids in leachate supply line 25. In one embodiment, the operation of sump blowdown pump 66 is continuous, but in alternate embodiments, the operation of sump blowdown pump 66 may be either cycled or used on an as needed basis. In distinct embodiments, sump discharge line 65 discharges a slurry having one or more of the following characteristics: a total solids content greater than 1% by weight; a total solids content greater than 3% by weight; a total solids content greater than 5% by weight; a total solids content less than 15% by weight; a total solids content less than 20% by weight; and a total solids content less than 25% by weight.

The dual cyclonic zone configuration causes entrained droplets to impinge onto the side wall of separation vessel 55 in two separate centrifugal separation stages.

Flue gas is discharged from an exhaust stack 80 located at the top of second cyclonic separation zone 57. Discharge of entrained droplets is minimized through use of the intermediate baffle 70 and variable speed discharge fan 75. The configuration of separation vessel 55 minimizes the condensation of water vapor due to cooling, resulting in a gas having high water content and minimal entrained liquid droplets. Exhaust stack 80 is equipped with temperature indicators. Temperature is monitored to assure efficient operation. Exhaust stack 80 may be controlled to a temperature that minimizes or eliminates the presence of a visible water vapor plume. Piping and equipment throughout the system is insulated as is practical for the purpose of preserving the heat value of the streams being utilized.

In an embodiment of the invention, the control system regulates the combustion system exhaust pressure. Proper pressure control contributes to efficient operation of the combustion system while capturing the substantial fraction of the heat value of the exhaust streams. The pressure in exhaust stacks 2 from each heat source are monitored by the control system. The pressure in exhaust stacks 2 are controlled such that the pressure of each is comparable to the others by operation of control valves 4. The control scheme further allows for taking individual combustion sources out of service. In the event that one of the combustion sources is taken out of service, control valve 4 in the line associated with the combustion source being taken out of service will close and may be programmed to do so automatically. Further, in the event that process conditions associated with an individual combustion source are upset, such as the pressure or temperature coming from a combustion source, control valve 4 in the line associated with the combustion source having the process upset may be closed and may also be programmed to respond in this way automatically. The control system will adjust the speed of the variable speed discharge fan 75 in order to control the pressure in the exhaust stack 2 at the desired set point. When the pressure at exhaust pressure transmitter 3 is at or near zero psig, essentially all of the exhaust gas is being drawn into the evaporative concentrator. In an embodiment of the invention, variable speed discharge fan 75 is controlled with a pressure control loop 5 that controls the amount of vacuum in the waste heat manifold 20 by way of waste heat manifold pressure transmitter 6. In another embodiment, variable speed discharge fan 75 is controlled with a control loop 5 that controls the pressure in exhaust stack 80. In another embodiment, variable speed discharge fan 75 is controlled based on pressure values from exhaust pressure transmitters 3. In embodiments where exhaust pressure transmitters 3 are being used to control variable speed discharge fan 75, the control system will calculate the average pressure based on readings from exhaust pressure transmitters 3 and use the average pressure to adjust the speed of variable speed discharge fan 75. In cases where the average pressures are being used to control variable speed discharge fan 75 and an individual control valve 4 is closed, the calculation of average pressure will no longer take into account the exhaust pressure transmitter 3 that has been isolated from the evaporative concentrator. In certain embodiments, this calculation adjustment occurs automatically.

Exhaust temperature control valve 7 may be controlled by an exhaust temperature controller 8 which receives stack temperature data 16 from exhaust stack 80. In such a control scheme, exhaust temperature control valve 7 would continue to open allowing exhaust gas from third engine exhaust 12 to flow to exhaust stack 80 until a desired temperature set point for exhaust stack 80 is met. Unused exhaust from third engine exhaust 12 would vent to the atmosphere through exhaust stack 2. In distinct embodiments, the gas discharged from second cyclonic separation zone 57 into exhaust stack 80, may have one or more of the following characteristics: temperature above 120° F.; temperature above 130° F.; temperature above 140° F.; temperature below 170° F.;

temperature below 180° F.; and temperature below 200° F.; water content above 15% water by volume; water content above 20% water by volume; water content above 25% water by volume; water content below 40% water by volume; water content below 45% water by volume; and water content below 55% water by volume. In distinct embodiments in which exhaust gas is supplied to exhaust stack 80 through supplemental waste heat manifold 21, the gas discharged from exhaust stack 80, may have one or more of the following characteristics: temperature above 150° F.; temperature above 180° F.; temperature above 200° F.; temperature below 270° F.; temperature below 350° F.; and temperature below 500° F.; water content above 15% water by volume; water content above 17% water by volume; water content above 20% water by volume; water content below 35% water by volume; water content below 40% water by volume; and water content below 50% water by volume.

It is understood that the array of features and embodiments taught herein may be combined and rearranged in a large number of additional combinations not directly disclosed, as will be apparent to one having skill in the art and that various embodiments of the invention may have less than all of the benefits and advantages disclosed herein.

There are, of course, other alternate embodiments which are obvious from the foregoing descriptions, which are intended to be included within the scope of the invention, as defined by the following claims.

We claim:

1. A method of concentrating a liquid waste stream comprising:
    a. supplying a first exhaust feed gas to a supply conduit through a first exhaust flow control device;
    b. regulating the first exhaust flow control device based on the pressure of the first exhaust feed gas;
    c. providing the first exhaust feed gas from the supply conduit to a mixing cavity;
    d. introducing a mixing cavity liquid feed into the mixing cavity to form a fluidized gas liquid mixture;
    e. conveying the fluidized gas liquid mixture from the mixing cavity to a first cyclonic separation chamber;
    f. removing a first liquid portion from the fluidized gas liquid mixture by centrifugal force within the first cyclonic separation chamber;
    g. removing a second liquid portion from the fluidized gas liquid mixture by centrifugal force in a second cyclonic separation chamber and introducing the second liquid portion to the first cyclonic separation chamber; and
    h. draining a liquid discharge from the first cyclonic separation chamber into a liquid sump.

2. The method of claim 1 wherein the first exhaust feed gas is a byproduct of the combustion of a biofuel.

3. The method of claim 1 wherein a gaseous discharge from the second cyclonic separation chamber flows into a gaseous concentrator discharge line.

4. The method of claim 3 further comprising conveying a second exhaust feed gas to the gaseous concentrator discharge line to form a combined gaseous discharge, wherein the gaseous discharge from the second cyclonic separation chamber has a relative humidity that is greater than the combined gaseous discharge from the gaseous concentrator discharge line.

5. The method of claim 3 wherein the temperature of the first exhaust feed gas is greater than 600° F.

6. The method of claim 3 wherein the second exhaust feed gas comprises a biofuel combustion exhaust stream.

7. The method of claim 3 wherein the gaseous discharge has a relative humidity that is higher than the relative humidity of the first exhaust feed gas.

8. The method of claim 1, wherein the mixing cavity liquid feed is the only substantial source of liquid phase water added to the mixing cavity.

9. The method of claim 1, wherein the liquid discharge has a volumetric flow rate that is less than 50% of the volumetric flow rate of the mixing cavity liquid feed.

10. The method of claim 1, wherein a volume reduction rate is represented by the difference between the mixing cavity liquid feed flow rate and the liquid discharge flow rate and the volume reduction rate is greater than 2% of the mixing cavity liquid feed flow rate.

11. The method of claim 1, wherein the mixing cavity liquid feed comprises solids.

12. The method of claim 1, wherein the mixing cavity liquid feed is aqueous.

13. The method of claim 1, wherein the mixing cavity liquid feed is not potable.

14. A method of concentrating a liquid waste stream comprising:
    a. supplying a first exhaust feed gas to a supply conduit through a first exhaust flow control device;
    b. regulating the first exhaust flow control device based on the pressure of the first exhaust feed gas;
    c. providing the first exhaust feed gas from the supply conduit to a mixing cavity;
    d. introducing a mixing cavity liquid feed into the mixing cavity to form a fluidized gas liquid mixture;
    e. conveying the fluidized gas liquid mixture from the mixing cavity to a first cyclonic separation chamber;
    f. separating a first liquid portion from the fluidized gas liquid mixture by centrifugal force and removing the first liquid portion from the first cyclonic separation chamber;
    g. conveying a first exhaust from the first cyclonic separation chamber to a second cyclonic separation chamber,
    h. separating a second liquid portion from the first exhaust by centrifugal force and removing the second liquid portion from the second cyclonic separation chamber; and
    i. conveying the second liquid portion from the second cyclonic separation chamber to the first cyclonic separation chamber; and
    j. draining a liquid discharge from the first cyclonic separation chamber into a liquid sump.

15. An evaporative concentrator comprising:
    a. a supply conduit in fluid communication with a source of a combustion heated gas;
    b. a mixing cavity in fluid communication with the supply conduit;
    c. a venturi in fluid communication with the mixing cavity;
    d. a multi-stage cyclonic separator in fluid communication with the venturi;
    e. wherein the cyclonic separator comprises a first cyclonic separation chamber and a second cyclonic separation chamber for separation by centrifugal force;
    f. a sump;
    g. a recycle line arranged and configured to deliver liquid from the sump to the mixing cavity;
    h. a gaseous concentrator discharge line;
    i. a gaseous flow path connecting the supply conduit, the mixing cavity, the venturi, the first cyclonic separation chamber, the second cyclonic separation chamber, and the gaseous concentrator discharge line respectively;

j. a first cyclonic separation chamber drain fluidly connected to the sump;

k. a second cyclonic separation chamber drain, wherein the second cyclonic separation chamber drain drains to the first cyclonic separation chamber; and l. wherein the gaseous flow path from the venturi to the first cyclonic separation chamber changes direction at an approximately right angle.

16. The evaporative concentrator of claim 15, wherein the first cyclonic separation chamber, the second cyclonic separation chamber, the sump and the gaseous concentrator discharge line comprise a single vessel.

17. The evaporative concentrator of claim 16, wherein the first cyclonic separation chamber, the second cyclonic separation chamber, the sump and the gaseous concentrator discharge line are aligned about a central axis.

18. The evaporative concentrator of claim 17, wherein the second cyclonic separation chamber drain is configured to pass fluid from the second cyclonic separation chamber through the first cyclonic separation chamber proximate the central axis to the first cyclonic separation chamber drain.

* * * * *